United States Patent
Trobaugh et al.

(10) Patent No.: US 9,314,711 B2
(45) Date of Patent: Apr. 19, 2016

(54) FUEL FILTER FOR THE REMOVAL OF A SOAP CONTAMINANT FROM DIESEL FUEL

(71) Applicant: CUMMINS FILTRATION IP, INC., Minneapolis, MN (US)

(72) Inventors: Corey W. Trobaugh, Columbus, IN (US); Shawn D. Whitacre, Columbus, IN (US); Cliffton J. Burbrink, Cookeville, TN (US); Barry M. Verdegan, Stoughton, WI (US); Mark T. Wieczorek, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 101 days.

(21) Appl. No.: 13/960,100

(22) Filed: Aug. 6, 2013

(65) Prior Publication Data
US 2014/0034577 A1    Feb. 6, 2014

Related U.S. Application Data (60) Provisional application No. 61/679,981, filed on Aug. 6, 2012.

(51) Int. Cl.
| | |
|---|---|
| *B01D 15/36* | (2006.01) |
| *B01J 39/04* | (2006.01) |
| *B01J 47/02* | (2006.01) |
| *C10G 31/09* | (2006.01) |
| *C10G 25/02* | (2006.01) |
| *C10L 1/02* | (2006.01) |

(52) U.S. Cl.
CPC ............. *B01D 15/361* (2013.01); *B01J 39/04* (2013.01); *B01J 47/022* (2013.01); *B01J 47/026* (2013.01); *C10G 25/02* (2013.01); *C10G 31/09* (2013.01); *C10L 1/023* (2013.01); *C10L 1/026* (2013.01)

(58) Field of Classification Search
USPC .................................................. 210/681, 683
See application file for complete search history.

(56) References Cited

U.S. PATENT DOCUMENTS

| | | | | |
|---|---|---|---|---|
| 2,225,366 | A | * | 12/1940 | Bray ............................. 508/524 |
| 2,980,606 | A | * | 4/1961 | Van Beest et al. ......... 208/254 R |
| 3,839,162 | A | * | 10/1974 | Ammer ...................... 205/781.5 |
| 5,082,568 | A | * | 1/1992 | Holler .......................... 210/679 |

(Continued)

FOREIGN PATENT DOCUMENTS

| | | |
|---|---|---|
| JP | 2006-105092 | 4/2006 |
| JP | 2008-163810 | 7/2008 |

(Continued)

OTHER PUBLICATIONS

International Search Report and Written Opinion for International Application No. PCT/US2013/053789, dated Oct. 24, 2013, 10 pages.

(Continued)

*Primary Examiner* — Chester Barry
(74) *Attorney, Agent, or Firm* — Foley & Lardner LLP (57) ABSTRACT

This disclosure describes a filtration system and method for removing soap from diesel fuel. The removal involves passing fuel through the filtration system. By removing soap, injector sticking and plugging can be reduced and for fuel already contaminated with soap, lubricity and/or corrosion inhibition functionality resulting from the conversion of carboxylic acid additives can be restored to metal carboxylates.

23 Claims, 7 Drawing Sheets

(56) References Cited

U.S. PATENT DOCUMENTS

| | | |
|---|---|---|
| 7,635,427 B2 | 12/2009 | Suzuki et al. |
| 8,070,940 B2 | 12/2011 | Yonemoto et al. |
| 2004/0060873 A1* | 4/2004 | Yanou et al. .................. 210/660 |
| 2004/0222140 A1 | 11/2004 | Bortnik |
| 2006/0063056 A1* | 3/2006 | Yasuda et al. .................. 429/33 |
| 2006/0261004 A1 | 11/2006 | Lockledge et al. |
| 2009/0090678 A1 | 4/2009 | Yonemoto et al. |
| 2010/0293844 A1 | 11/2010 | MacMillan |
| 2012/0118809 A1 | 5/2012 | Bauer et al. |
| 2012/0248034 A1* | 10/2012 | Segit et al. .................. 210/504 |
| 2012/0297666 A1* | 11/2012 | Zuckerman .................. 44/307 |
| 2013/0263497 A1* | 10/2013 | Sohling et al. .................. 44/388 |
| 2014/0294693 A1* | 10/2014 | Baum et al. .................. 422/187 |

FOREIGN PATENT DOCUMENTS

| | | |
|---|---|---|
| WO | WO-2010/003504 | 1/2010 |
| WO | WO-2010/063522 | 6/2010 |

OTHER PUBLICATIONS

International Preliminary Report on Patentability and Written Opinion of the International Searching Authority issued for PCT/US2013/053789, dated Feb. 10, 2015.

* cited by examiner

FUEL FILTER FOR THE REMOVAL OF A SOAP CONTAMINANT FROM DIESEL FUEL

FIELD

A filtration system and method for removal of undesirable soap from fuel are described. Fuel is passed through the filtration system that includes an appropriate ion exchange media or resin and filter media.

BACKGROUND

Fuel cleanliness requirements for fuel injection systems are extremely demanding in order to ensure reliable and robust engine performance. To a large degree, fuel filtration is responsible for meeting the fuel cleanliness requirements associated with the control of abrasive particles and non-dissolved water. However, the presence of soaps in fuel can cause injector sticking, and in extreme cases may even plug fine filters. Soaps, for purposes of this disclosure, are defined as any chemical species that can be measured using American Oil Chemist's Society (AOCS) standard Cc17-95 Soap in Oil Titrimetric Method (American Oil Chemist's Society (AOCS) standard Cc17-95 Soap in Oil Titrimetric Method) adapted for use in fuel. Typically, soaps are metal carboxylates. They may be present as semi-solids or soft contaminants at ambient temperatures, or as dissolved species that may become solids under temperature and pressure conditions found in fuel systems. Soap issues are typically the result of the use of carboxylic acid based fuel lubricity enhancers or corrosion inhibitors used to protect pipelines. When fuel is contaminated with metal ions, such as those that may be carried in with water or lube oil contamination, hydrogen ions are exchanged for metal ions and soaps are formed. Basic moieties found in diesel fuel, such as those resulting from the fuel refinery processes or marine transport, e.g., NaOH, $Ca(OH)_2$, or lube oil contamination, react with the carboxylic acid to remove the hydrogen ion, resulting in a water molecule and metal carboxylate. Soaps are less soluble than the parent carboxylic acids, and they may also reduce the effectiveness of the corrosion inhibitor additive. To a large extent, soap issues have been dealt with by attempts to improve the quality of bulk fuel prior to delivery and through the use of additives that clean soap deposits from injectors or prevent their deposition. However, these methods are not always effective or practical and hence, there is a desire for a filter solution to the soap problem. Preferably, this would be in the form of filtration on-board the engine or vehicle, or at the point-of-use/delivery to the engine fuel tank.

Under field conditions, conventional on-board fuel filtration does not remove soap nor eliminate injector sticking issues. It has been reported that semi-solid metal carboxylates have plugged high efficiency bulk fuel tank filters (Steven R. Westbrook, James Doyle, Philip Johnson, "Analysis and Identification of Contaminants in Diesel Fuel Filtration and Storage Systems," Proc. 10th International Filtration Conference, September 2010) and have been found in ultra-high efficiency advanced fuel filters (Mark Wieczorek, William Haberkamp, Barry Verdegan, "NEXT GENERATION DIESEL FUEL FILTER," Proc. World Filtration Congress 11, April 2012). Despite this, one would not expect this approach to eliminate soap issues, since the problems occur at such low concentration levels. Sodium concentrations that are less than 0.1 ppm Na typically do not cause issues, while concentrations as low as 1 ppm and higher are known to cause sticking. For concentrations between 0.1 and 1 ppm Na, problems may or may not occur depending on the nature of the carboxylic acid and its concentration. To put this in perspective, 1 ppm Na present as the salt of hexadecenyl succinic acid, a corrosion inhibitor known to cause injector deposits, is enough to form one ~3 μm soap particle per mL of fuel. This is smaller than the 6 to 15 μm particles that conventional fuel filters are designed to remove. Indeed, it is smaller than the particle size that the particle counters used in the industry for contamination control are even able to detect. It is noteworthy that for other metals, such as Pb, Zn and Cu, issues occur at even lower concentrations (WO 2010/003504 A1 Removal of Metal from Diesel Fuel). As a practical matter, much of the metal carboxylate present at these concentrations remains soluble at ambient conditions. In engine applications, soap formation is most commonly associated with the presence of Na, K, Ca, or Mg ions, although others, including Pb, Zn, Cu, and Fe, may also cause issues. Thus, one would not expect conventional filtration to offer a viable solution to the soap problem.

WO 2010/003504 A1 describes the use of ion exchange resins to remove metal ions from fuel. One would expect that soap would not form if the metal ions were removed. In this application, the ability to remove the selected metal was demonstrated. However, the lubricity of the fuel was not improved and in some cases was actually decreased by ion exchange. A significant shortcoming of the method is that, it does not address the removal of soap that was previously formed, notably semi-solid soaps. In this form, the metal is not present in ionic form, and therefore, not amenable to removal by ion exchange. In practical applications, including on-board filtration, the soaps form upstream of the removal process at the point of metal contamination, hence are already present.

SUMMARY

This disclosure describes a system and method for removing undesirable soap from an application fluid. In one example, the application fluid can be diesel fuel.

A filtration system can be used for removal of the undesirable soap from diesel fuel. The filtration system can include one or more housings, ion exchange media and filter media. The ion exchange media and filter media can be contained in one or more housings. The ion exchange media is capable of removing one or more species of dissolved metal ions, and hence neutralizing soap from fuel, using ion exchange resins. The filter media is capable of removing insoluble soap.

The filtration system can further include a color indicator to indicate when the resins included in the ion exchange media have reached their exchange capacity.

The method involves passing the fuel through a filtration system with an appropriate ion exchange media and filter media. In the process, soap formed from the conversion of carboxylic acid lubricity and/or corrosion inhibitor additives to metal salts are restored to acid form and their functionality restored.

DETAILED DESCRIPTION

This disclosure describes a system and method for removing soap from application fluid, for example, diesel fuel (any form of diesel fuel, including but not limited to ultra-low sulfur diesel, hydrotreated distillate fuel, or biodiesel). Soaps, for purposes of this disclosure, are defined as any chemical species that can be measured using the American Oil Chemist's Society (AOCS) standard Cc17-95 Soap in Oil Titrimetric Method adapted for use in fuel. Typically, soaps are metal carboxylates. They may be present as semi-solids or soft contaminants at ambient temperatures, or as dissolved species that may become solids under temperature and pressure conditions found in fuel systems.

Removal of the soap from fuel involves passing fuel through the filtration system. By removing soap, injector sticking and plugging can be reduced and for fuel already contaminated with soap, lubricity and/or corrosion inhibition functionality resulting from the conversion of carboxylic acid additives can be restored (typically, additives are used to dissolve injector deposits or prevent their formation; see WO 2010/003504 A1).

The filtration system can include:

One or more housings (cannisters, vessels, pipes, or other plumbing), preferably suitable for on-board engine filtration, containing ion exchange media and filter media possessing a fuel inlet to the housing and a fuel outlet to the housing(s).

Ion exchange media capable of removing one or more species of dissolved metal ions from fuel. In some examples, the ion exchange media is an ion exchange resin. The term "ion exchange resin" herein means a substance that contains a functional group for ion exchange. The substance can have a polymeric structure. The ion exchange resin can be in the form of beads. Preferably, the ion exchange resin is a cation exchange resin in acid form that is able to remove a broad spectrum of metal ions selected from, but not limited to the following: Na, K, Mg, Ca, Zn, Fe, Cu, Al and Pb in their appropriate valencies. For example, Na and K have a valency of one, Mg, Ca, Zn Cu, and Pb have a valency two, and Al and Fe have a valency of three. Sulfonate or carboxylate functionalized resins may be used, but other types of functional groups are also envisioned. A mixed bed of ion exchange media with differing selectivities for various metal species may also be used. Preferably, the ion exchange media is fuel resistant (does not swell, does not physically nor chemically degrade, nor functionally be adversely affected by usage fuel). In some examples, the cation exchange can be in the acidified form.

Filter media designed to remove insoluble soap. Such media, under operating conditions exhibits (1) a beta ratio of greater than about 20 (ISO 16889: 2008 Hydraulic fluid power—Filters—Multi-pass method for evaluating filtration performance of a filter element) at about 4 µm(c) or (2) a mean flow pore size of less than about 5 µm.

Figure 1:
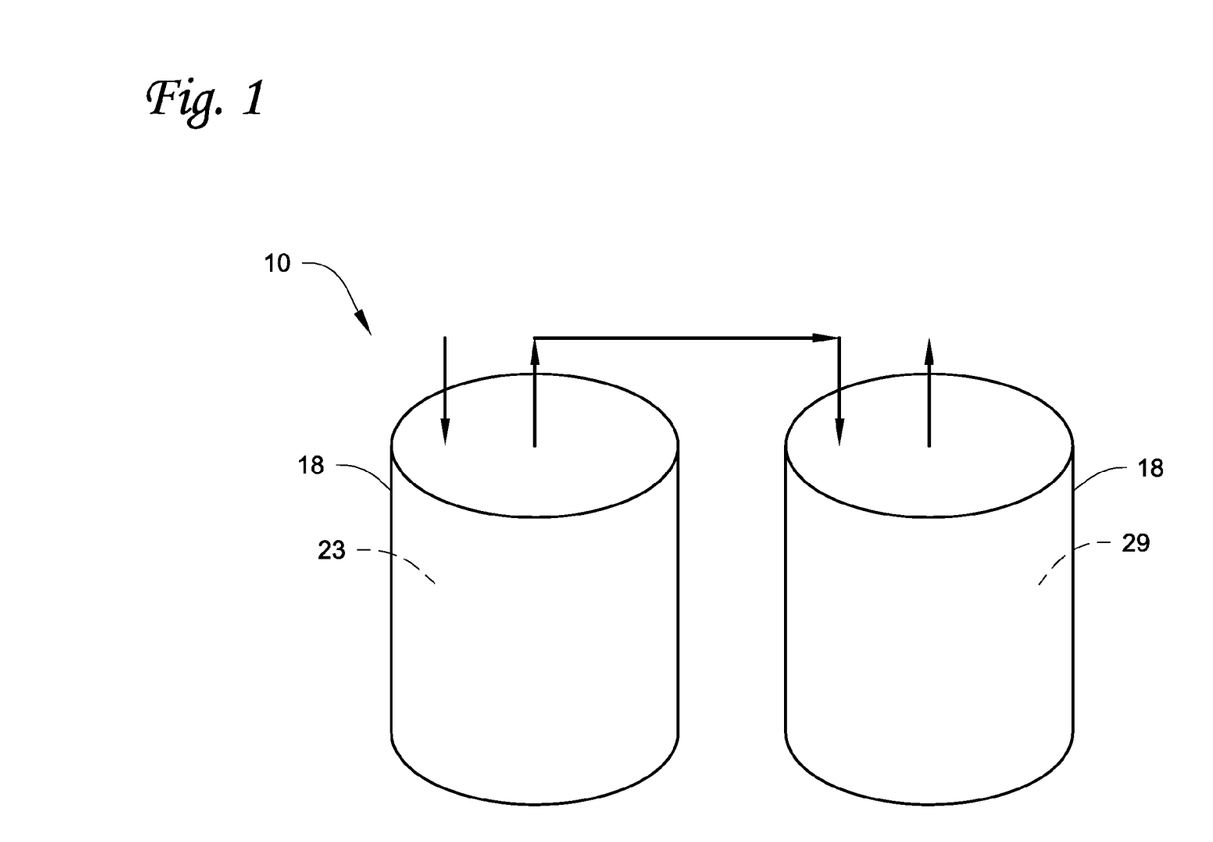
FIG. 1 schematically depicts the concept of a filtration system where the ion exchange media and the filter media reside in different housings.

FIG. 1 schematically illustrates the concept of a filtration system 10 in embodiments with separate housings 18 for filter media 23 and ion exchange media 29 arranged in series with the filtration media and filtration processes occurring first. It is envisioned that the order of the media could be reversed or that additional stages of filtration and/or ion exchange media could be used. Additional description and embodiments will now be discussed.

Preferably, insoluble (precipitated) soap removal would occur upstream of ion exchange to extend the life and function of the ion exchange media. In some cases, it may be desirable to reverse the order or to have an additional filter media section downstream of the ion exchange media to prevent the passage of undesirable species, e.g., water, ion exchange media, from the device. The filter media and ion exchange media could reside in different housings, or in the same housing. For brevity, neither shows the sealing method which may, for example, involve axial or radial seals.

It is also envisioned that the filter media and ion exchange media could be co-located or that the ion exchange media could be used under flow and size (volume) conditions such that the ion exchange media by itself would provide sufficient insoluble soap removal to eliminate the need for a separate filter media.

The properties of the ion exchange media have already been described. A strong cation exchange resin was used in lab simulations to verify removal of Na. In general, ion exchange media with sulfonate functionality have been found to be particularly beneficial in removing, capturing and/or sequestering a broad spectrum of metal ions. In order to avoid contaminating the fuel with water, resins are used in dry form. To some extent, this limits their effectiveness in that the dry form is difficult to handle and package due to electrostatic charging. Further, the actual amount of dissociated metal ion in fuel is low compared to the amount still associated with the organic counterion, due to the low polarity of fuel. Since ion exchange only removes soluble ions, it is anticipated that the total amount of metal that can potentially be removed is reduced. On the other hand, these metals are extremely water soluble.

In one embodiment, the ion exchange media is used in wetted form. The fluid used for wetting can be a polar liquid, which can include water, methanol, ethanol, biodiesel and the like, or mixture thereof. In the description that follows, water is used as the fluid for wetting.

It is not desirable that the media be suspended in water, rather that it simply be water wetted. In this manner, metal ions can dissolve into the water phase for subsequent removal by the ion exchange media, taking advantage of their high solubility in water. This has the further advantage of making the ion exchange media easier to handle, process and package. Finally, the amount of water potentially available for migration into the engine fuel system by this embodiment is extremely small, thus not expected to be detrimental to the engine.

As previously noted, the filter media must be designed to remove insoluble soap. The challenge to doing this is that the size of the insoluble soap semi-solids is unknown and that they are soft contaminants, i.e., they can deform and change shape. By assuming a 1 ppm Na concentration, that all Na becomes an insoluble salt of hexadecenyl succinic acid additive, and that the density of the salt is 1 g·cm$^{-3}$, it can be estimated that the particles are expected to be 3 µm or smaller. For higher concentrations and lower densities, the particle size could be correspondingly larger. Experimentally, this was verified by fitting operating engines with different fuel filter media having mean flow pore sizes of 2, 3, and 5 and 10 µm. The used filters were then analyzed by scanning electron microscopy (SEM), energy dispersive X-ray spectroscopy (EDX), and Fourier transform infrared spectroscopy (FTIR) for their soap content. No significant soap, as indicated by amount of Na and Ca, was present on 10 µm media. Na was detected but not at significant levels on the 5 µm media. Substantially significant levels of both Na and Ca soap were detected on the 2 and 3 µm media. This confirms the previous estimation that soap particles are present at sizes smaller than 5 µm. Thus, filter media designed for effective soap removal can have a pore size smaller than about 5 µm. Alternatively, the filter media can have a beta ratio at about 5 µm(c) greater than about 100 (i.e., removal efficiency greater than about 99%) or at about 4 µm(c) greater than about 20 (removal efficiency greater than about 95%).

Typically, filter media meeting these requirements will be polymeric or glass fiber synthetic filter media. Preferably, the filter media will be a composite containing of polymeric material, typically polyesters and polyaramides and nanofibers. The composite media are designed to be capable of capturing particles smaller than about 5 µm(c) with high efficiency. To accomplish this, a nanofiber composite media including layers of pleated polymeric media with the tightest layer having a mean pore diameter of <5 µm can be used. The initial layers can be arranged to provide graded capture of particles and semi-solids, including soap. This can be followed by a nanofiber layer with mean pore size smaller than about 5 µm. This layer can be engineered to have the smallest possible difference between the minimum and maximum pore size to prevent particles from passing through under transient operating conditions. Downstream of the nanofiber layer can include less restrictive layers for support and to protect the media during handling.

Figure 2A:
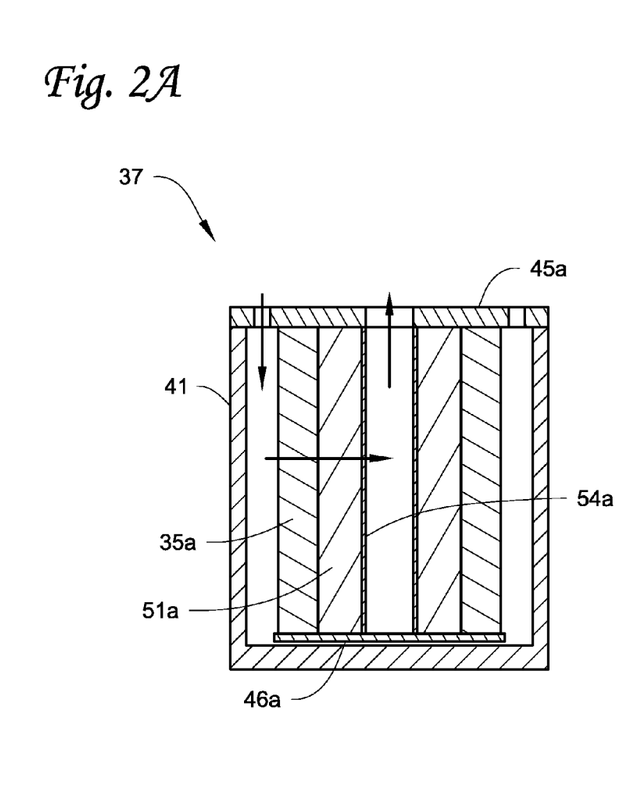
FIGS. 2A and 2B schematically depict examples of a device in a housing and a device as a filter element, respectively.
Figure 2B:
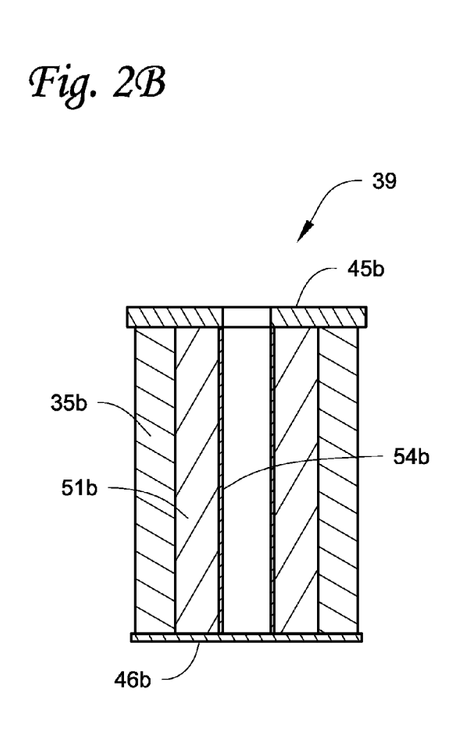

Alternatively, polymeric or glass membrane material can be used as the filter media. As before, the pore size can be smaller than about 5 µm. Referring to FIGS. 2A and 2B, both fibrous filter media and membrane media can be used as filter media 35a, 35b in a device in housing 37 and a device as filter element 39, respectively. The device in housing 37 includes a housing 41 that surrounds the filter media 35a. Each of the device in housing 37 and the device as filter element 39 includes top endcaps 45a, 45b and bottom endcaps 46a, 46b, respectively. The filter media 35a, 35b can also be used downstream of ion exchange media 51a, 51b with ion exchange media retainers 54a, 54b, respectively, as shown in FIGS. 2A and 2B. In this role, it prevents the potential migration of ion exchange media downstream into the fuel system and, if the ion exchange media is used in wet form, also acts as a barrier to downstream transport of water.

Figure 3:
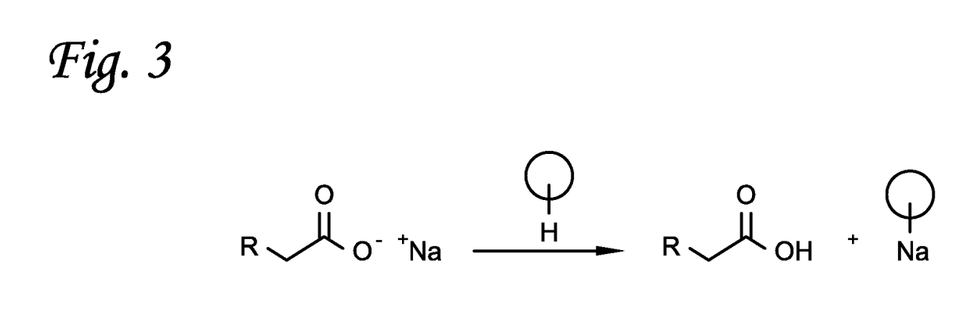
FIG. 3 illustrates the reaction mechanism involved in converting "soap" using an ion exchange resin.

One embodiment in which the ion exchange resin is incorporated into the filter media will now be described. A strong acid ion exchange resin with a particle size ranging from about 150 µm to about 500 µm can be incorporated into the filter media. Strong acid ion exchange resins can be designed to transfer a hydrogen ion (proton) to a metal carboxylate, thereby re-establishing a carboxylic acid (see FIG. 3). The metal ion is then transferred back to the resin where it becomes stabilized and resides for the duration of the fuel filter service interval. Fuel enters the filter, similarly to other on-board diesel fuel filters, passes through the ion exchange resin, which is encased in filter media, and finally out the outlet port back into the fuel line, minus any soap contamination. There are multiple designs that can be incorporated in the filter housing. Also, this type of resin would have no impact on other beneficial fuel additives (i.e. lubricity improver). The resin is designed to only interact with metallic ions, as seen in the soap contaminant.

Figure 6:
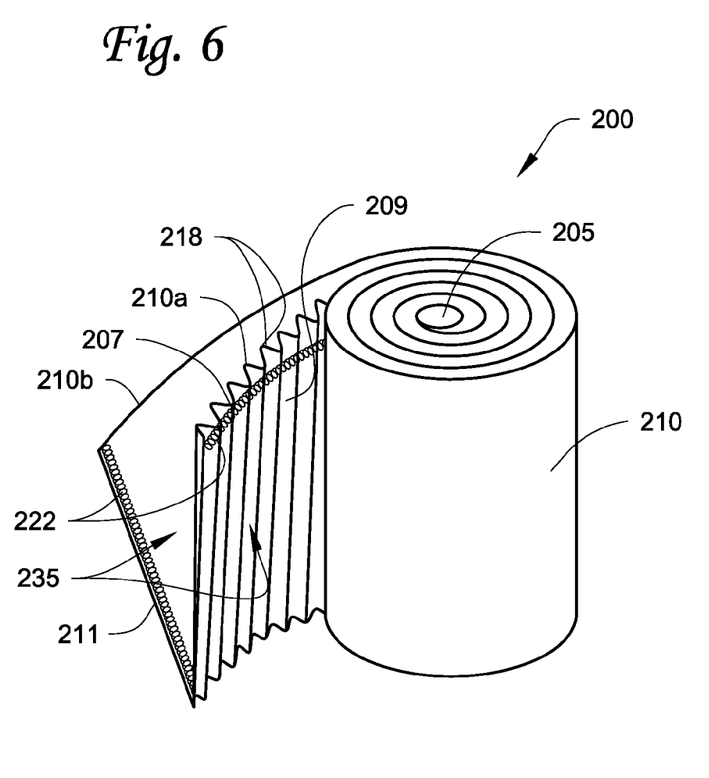
FIG. 6 shows a schematic view of a filter element that includes a media roll with resin beads.
Figure 7A:
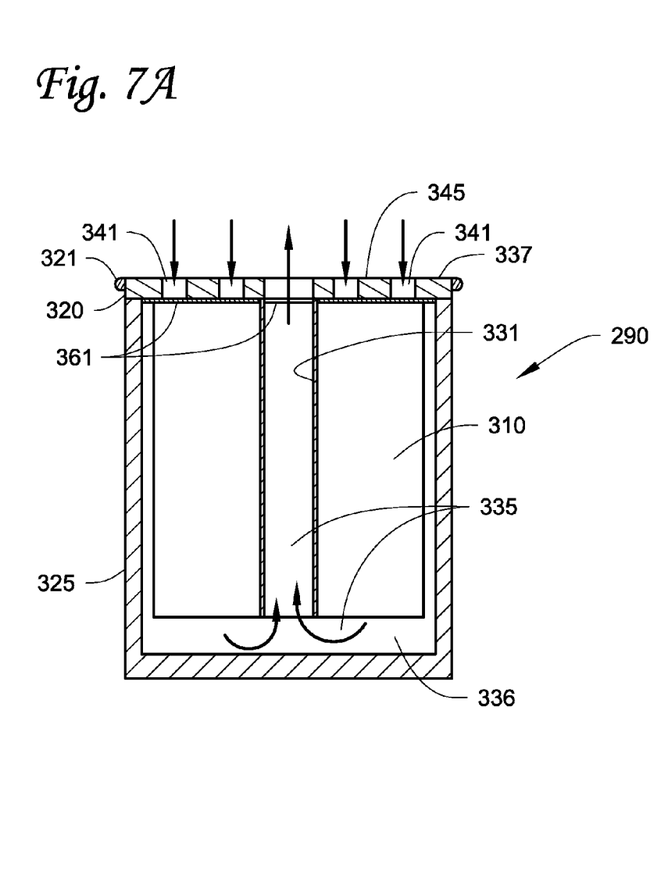
FIG. 7A shows a cross-sectional view of a device that includes a media roll with resin beads.
Figure 7B:
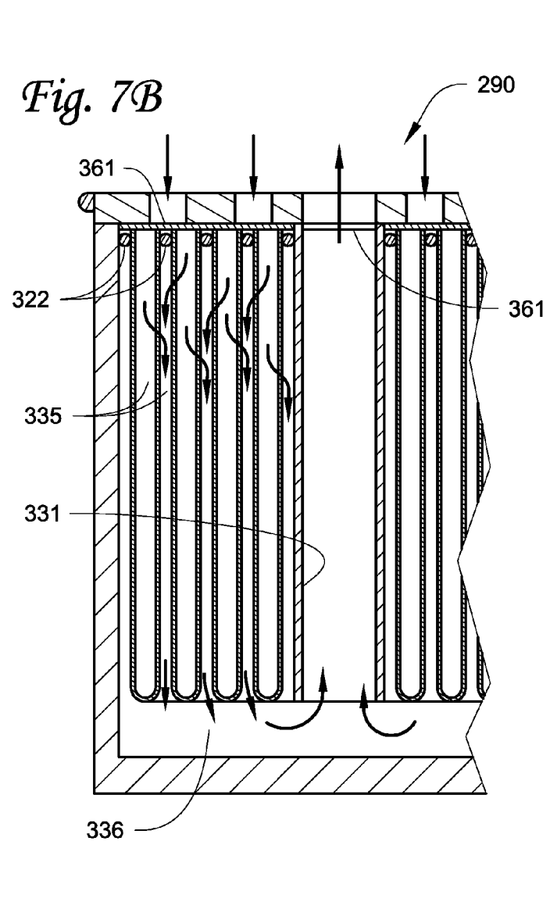
FIG. 7B shows another cross-sectional view of a device that includes a media roll with resin beads.

In filtration systems using fibrous filter media, particularly involving liquids being filtered at high pressure drop and/or high fluid velocities, there is a potential for the filter media to collapse or be ruptured by the fluid flow. To avoid this, there are two basic design strategies: (1) reduce the flow rate and, therefore, the corresponding pressure drop such that this is no longer an issue; or (2) support the media with a stronger, stiffer porous material, such as a cellulose media layer, or metal or plastic screen. The problem with the first approach is that the filter must be larger and space is typically unavailable. The problem with the second approach is that the stiffer media makes the resultant filter media thicker and corresponding less filter media surface area is available, reducing the contaminant holding capacity and service life of the filter. In one embodiment of this invention, this problem is overcome by combining the upstream filtration media with downstream ion exchange media in the same filter element. This is schematically illustrated in FIGS. 5, 6 and 7.

Figure 5A:
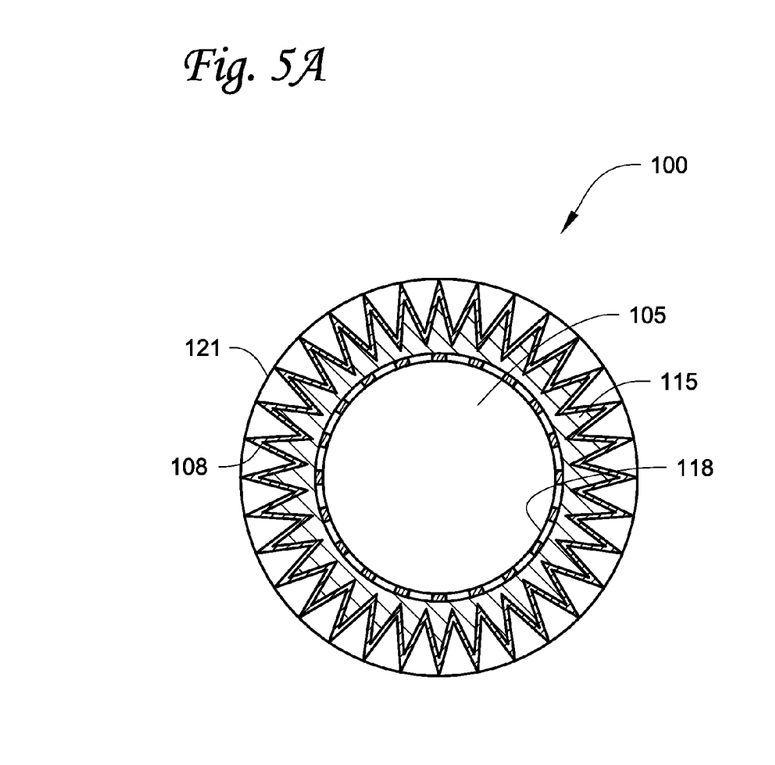
FIG. 5A shows a cross-section of a filter element with filter media supported by ion exchange media, according to one embodiment.

FIG. 5A shows a cross-section of one embodiment of a filter element 100 that includes ion exchange media 115. The filter element 100 includes a central cavity 105 that is surrounded by the ion exchange media 115. The filter element 100 further includes an endcap 121, an ion exchange media retainer 118 and filter media 108. Note that FIG. 5 shows the filter element 100 as being circular as viewed in cross-section and the filter media 108, the ion exchange media 115 and the retainer 118 circumscribing the central cavity 105. However, it is to be realized that the filter element 100 can be any shape that is suitable for use as a filter, e.g., a square as viewed in cross-section. Moreover, it is to be realized that each of the filter media 108, the ion exchange media 115 and the retainer 118 do not have to be one continuous sheet and can be split, e.g., into more than one section or panel, where each of the sections or panels surrounds at least a portion of the central cavity 105.

Figure 5B:
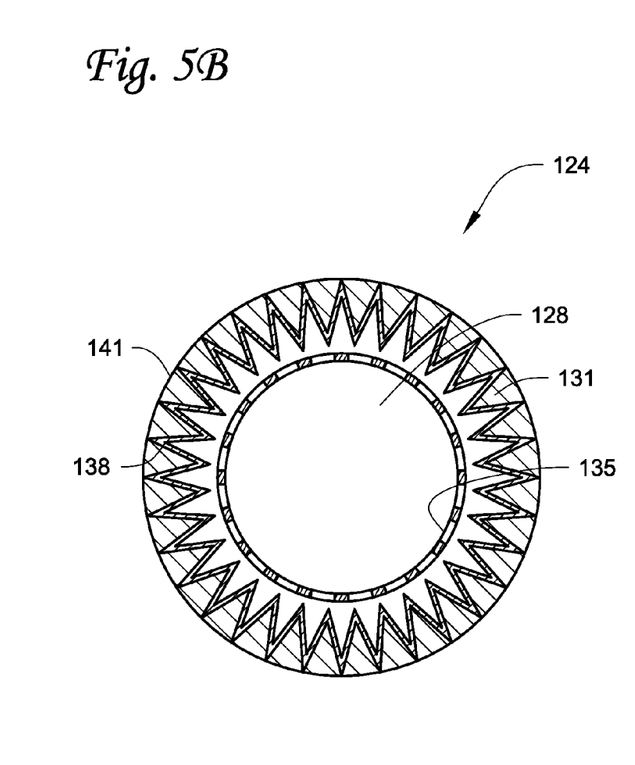
FIG. 5B shows a cross-section of a filter element with filter media supported by ion exchange media, according to another embodiment.

FIG. 5B shows a cross-section of another embodiment of a filter element 124 that includes ion exchange media 131. The filter element 124 includes a central cavity 128 that is surrounded by filter media 138. In this embodiment, the ion exchange media 131 is provided on the outer side of the filter media 138 relative to the central cavity 128. The filter element 124 further includes an endcap 141, and an ion exchange media retainer 135. Note that FIG. 5B shows the filter element 124 as being circular as viewed in cross-section and the filter media 138, the ion exchange media 131 and the retainer 135 circumscribing the central cavity 128. However, it is to be realized that the filter element 124 can be any shape that is suitable for use as a filter, e.g., a square as viewed in cross-section. Moreover, it is to be realized that each of the filter media 138, the ion exchange media 131 and the retainer 135 do not have to be one continuous sheet and can be split, e.g., into more than one section or panel, where each of the sections or panels surrounds at least a portion of the central cavity 128.

Note that the ion exchange media can be in forms other than a sheet in any one of the embodiments described herein. In some examples, the ion exchange media can be in the form of loose polymeric beads. In some instances, the ion exchange media that is in the form of beads or resin may be supported by a filter media, a center tube, a housing, or other structures.

FIG. 6 shows a pleated filter media style of filter element 200, utilizing filter media as previously described. The filter element includes a center tube 205 and media 210 in the form of a roll having a plurality of layers (hereinafter, "media roll") surrounding the center tube 205. The media roll 210 includes a corrugation side 210a and a flat side 210b. A sealant 222 is provided at a top edge 207 on the corrugation side 210a towards an inside 209 of the media roll 210. In some examples, the sealant 22 prevents fuel to bypass the media roll 210. Also, the sealant 222 is provided vertically down an end 211 of the media roll 210. In some examples the media roll 210 is sealed to the center tube 205. Structural support against the pleat or media collapse is provided by ion exchange resin beads 235 packed inside pleats 218 of the rolled media 210. The resin beads 235 provide the structural support that otherwise would have been provided by a supporting layer of filter media or screen. This will also allow for thinner media to be used, further increasing possible media area density, number of flow channels & the corresponding dwell time of fuel in resin, and filter contaminant capacity. An ion exchange media retainer (not shown), such as a porous or perforated tube or screen is used to retain the ion exchange resin beads 235. It is envisioned that the use of the ion exchange resin beads 235 to provide structural support to the media roll 210 can be used in other filter media packaging geometries, including honeycomb wall flow filters, etc.

FIG. 7A shows a cross-sectional view of a device 290 that includes a media roll 310 in a housing 325. In some examples, the media roll 310 is similar to the media roll 210 discussed above. In some instances, the media roll 310 is provided with resin beads 335 and function in a similar manner as that of the resin beads 235. The device 290 includes a center tube 331, and the media roll 310 surrounds the center tube 331. In some examples, the resin beads 335 are provided within the center tube 331 and/or an area 336 below the media roll 310. The media roll 310 is sealed to the center tube 331. The device 290 further includes a top endplate 345 at a top end 337 of the device 290. In some examples, an outer rim 320 of the top endplate 345 is provided with a seal 321. The top endplate 345 includes passageways 341 through which incoming fluid is received.

Referring to FIGS. 7A and 7B, the incoming fluid passes through a top screen 361 that is provided at the top end 337 below the top endplate 345 and down to the media roll 310. The media roll includes a sealant 322 that prevents fuel from bypassing the media roll 310. The fluid passes through the media roll 310 and down to the area 336 below the media roll 310. The fluid then passes upward through the center tube 331 and through the top screen 361.

In some examples, not only is the ion exchange media used to support the filter media enabling increased media surface area, but it also enables the ion exchange media to be packaged in otherwise unused space within the filter element, thus reducing the overall size of the combined filter-ion exchange filter. The resin could also be captured between the fibers in the filter media itself. This could replace the resin filling void volumes around the media, or could be done in conjunction to further increase resin surface area in the filter & dwell time.

In some examples, the resin has the following properties:

1. The resin has the potential to only be active when the soap contaminant is present. If no soap is present, the resin remains dormant and will have an extended service life. Once soap is detected, the resin begins to exchange protons for metal ions and inactivate it.

2. The resin can be regenerated once the service interval has been reached. In this case, regeneration of the resin means that the damaging metal ion can be exchanged back for the hydrogen ion and the filter can be reused. This regeneration process can occur between 3-5 times before the resin is unable to be completely regenerated.

In some embodiments, the filtration system can further include a color indicator to indicate when the resin has reached its exchange capacity. The color indicator can be included anywhere in the filtration system, including the filter media. In some examples, the color indicator is a dye. In some examples, the dye is included in the ion exchange resin.

Figure 4:
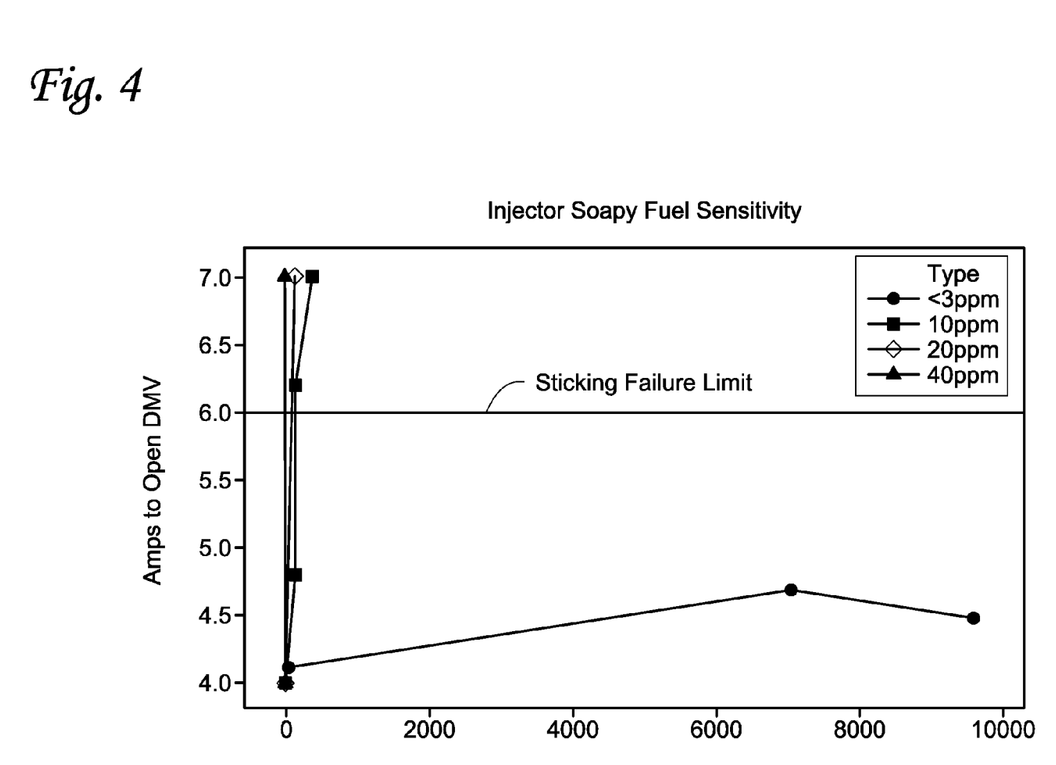
FIG. 4 is a graph showing the "acceptable" levels of soap confirmed with engine tests.

FIG. 4 is a graph showing the "acceptable" levels of soap confirmed within the duration of the engine test. However, it has been proven that lower concentrations of soap can degrade injector performance over extended periods of time.

EXPERIMENTAL DATA

1. Batch tests were conducted to confirm that ion exchange resins could remove soap from ultra-low sulfur diesel fuel. Soapy fuel was prepared by adding a known amount of sodium hydroxide to an aliquot of diesel fuel. A carboxylic acid is then added to a second aliquot of diesel fuel and once both mixtures are homogenous, the aliquots are combined. This fuel was then added to known amounts of the filter resin and the amount of soap remaining in the fuel after 5 hrs. measured. The experiment was conducted for two different commercially available ion exchange resins. 4.0 g of filter resin reduced the amount of soap from 45 ppm to 6 ppm, an 87% reduction in the amount of the soap contaminant. For the second resin 4.0 g of filter resin reduce the amount of soap from 32 ppm to 2 ppm, a 93% decrease in the amount of soap.

3. Flow tests were conducted to determine how the filter resin affects other fuel properties. Soapy fuel (prepared in the same fashion as the fuel above) was passed through a predetermined amount of filter resin. The flow rate of the fuel was kept to a minimum to ensure 95% inactivation of the soap contaminant. The eluent fuel was collected and analyzed to determine if the resin altered the commonly monitored properties of the fuel. The following table compares the measured properties of the purified (eluent) fuel to the fuel's original specification (American Society of Testing and Materials (ASTM) D975-11b: Standard Specification for Diesel Fuel Oils).

| Fuel Property | Result of purified fuel | Specification |
|---|---|---|
| Sulfur | 11 ppm | <15 ppm |
| Kinematic Viscosity | 2.392 cSt | 1.9-4.1 cSt |
| Distillation Temperature (90% rec.) | 318° C. | 282-338° C. |
| Lubricity | 400 μm | 520 μm |
| Flashpoint | 146° F. | 125° F. |
| Copper Corrosion | 1 A | <3 |

From the table, none of the fuel properties tested against the industry standard was adversely affected. In fact, the lubricity of the purified fuel showed an improvement.

When compared to a control sample, the lubricity result shows an improvement from 440 μm to 400 μm. Even though the result falls within the repeatability of this test method (50 μm), it could be surmised that, because the filter media inactivates the corrosive soap contaminant, lubricity could be restored and improved.

As mentioned above, soap is a fuel contaminant that can stick or plug injectors, reduce fuel lubricity or corrosion inhibition functionality, and, in extreme cases, plug filters. There have been no previous efforts that the inventors are aware of to control soap, in soluble or insoluble form, using engine or point-of-use filtration. Conventional fuel filters provide inadequate removal of insoluble soaps and are incapable of controlling soluble soap, e.g., metal carboxylates. This is born out in the field by reports of injectors sticking, even for engines using conventional fuel filtration. Ion exchange has been shown e.g., in WO 2010/003504 A1, to reduce the concentrations of selected metal species, but does not remove insoluble soaps. WO 2010/003504 A1 conceives that ion exchange resins could be impregnated into or onto a filter media support to control metal concentrations, i.e., the soluble species, but does explicitly teach control of soap. Soap consists of soluble and insoluble components and WO 2010/003504 A1 does not teach the simultaneous removal of both dissolved and insoluble soap. In the context of filtration, it specifically refers to the function of filter media as a solid support, i.e., serving a structural function, and is silent on the removal or even existence of insoluble species. The supporting experiments only consider dissolved species.

The disclosed system and method address the above issues by using a combination of high efficiency filter media and ion exchange resin to simultaneously control soluble and insoluble soap. In some embodiments, water or polar liquid wetted ion exchange media is utilized to enhance mass transfer of metals from fuel to water or polar liquid to ion exchange material for a fuel application. In some embodiments, the method involves removing soluble soap by ion exchange and insoluble soap by filtration to protect the fuel system and restore fuel lubricity and/or corrosion inhibition functionality that has been lost by the conversion of the corresponding carboxylic acid additives to metal carboxylates likewise.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A filter element, comprising
    a filtration media configured to remove at least one metal carboxylate soap that is present in a fluid, wherein the filter media has a mean flow pore size of less than 5 microns; and
    an ion exchange media configured to remove a metal ion from the fluid.
2. The filter element of claim 1, wherein the filtration media surrounds at least a portion of a central cavity.
3. The filter element of claim 1, wherein the ion exchange media surrounds at least a portion of a central cavity.
4. The filter element of claim 1, wherein the fluid is diesel fuel.
5. The filter element of claim 4, wherein the metal ion is at least one selected from the group consisting of Na, K, Mg, Ca, Zn, Fe, Cu, Al and Pb, and wherein Na and K have a valency of one, Mg, Ca, Zn, Cu, and Pb have a valency two, and Al and Fe have a valency of three.
6. The filter element of claim 1, wherein the ion exchange media includes a cation exchange resin.
7. The filter element of claim 1, wherein the ion exchange media is wetted with a polar liquid.
8. The filter element of claim 7, wherein the polar liquid is at least one selected from the group consisting of water, methanol, ethanol and biodiesel.
9. The filter element of claim 1, further comprising an ion exchange media retainer.
10. The filter element of claim 1, wherein the filter media has a mean flow pore size of less than 3 microns.
11. The filter element of claim 1, wherein the filter media has a beta ratio of greater than 20 at 4 $\mu m(c)$.
12. The filter element of claim 1, wherein the ion exchange media is in the form of resin beads.
13. The filter element of claim 1, wherein the filter media is in the form of a roll having a plurality of layers.
14. The filter element of claim 1, wherein the ion exchange media contains a resin, and the resin contains an indicator dye.
15. A filtration system for filtering a fluid, comprising:
    an ion exchange media that is configured to remove one or more dissolved metal ions from the fluid;
    a filter media that is configured to remove at least one metal carboxylate soap that is present in the fluid, wherein the filter media has a mean flow pore size of less than 5 microns; and
    one or more housings that contain the ion exchange media and the filter media.
16. The filtration system of claim 15, wherein the fluid is diesel fuel.
17. The filtration system of claim 15, wherein the metal ion is at least one selected from the group consisting of Na, K, Mg, Ca, Zn, Fe, Cu, Al and Pb, and wherein Na and K have a valency of one, Mg, Ca, Zn, Cu and Pb have a valency of two, and Al and Fe have a valency of three.
18. The filtration system of claim 15, wherein the ion exchange media includes a cation exchange resin.
19. The filtration system of claim 18, wherein the cation exchange resin in an acidified form.
20. The filtration system of claim 15, wherein the ion exchange media is in the form of resin beads.
21. A method for removing undesirable soap in diesel fuel, comprising:
    removing soluble soap contained in the diesel fuel by ion exchange; and
    removing insoluble metal carboxylate soap contained in the diesel fuel by filtration using a filter media having a mean flow pore size of less than 5 microns.
22. A filter element, comprising a filter media configured to remove at least one metal carboxylate soap from diesel fuel, wherein the filter media has a mean flow pore size of less than 5 microns, an ion exchange media configured to remove a metal ion from diesel fuel, and an ion exchange media retainer, wherein each of the filter media, the ion exchange media the ion exchange media circumscribes a central cavity.
23. The filter element of claim 22, wherein the filter element is configured so that the filter media is provided between the ion exchange media and the ion exchange media retainer, or the ion exchange media is provided between the ion exchange media retainer and the filter media.

* * * * *